United States Patent Office 3,030,062
Patented Apr. 17, 1962

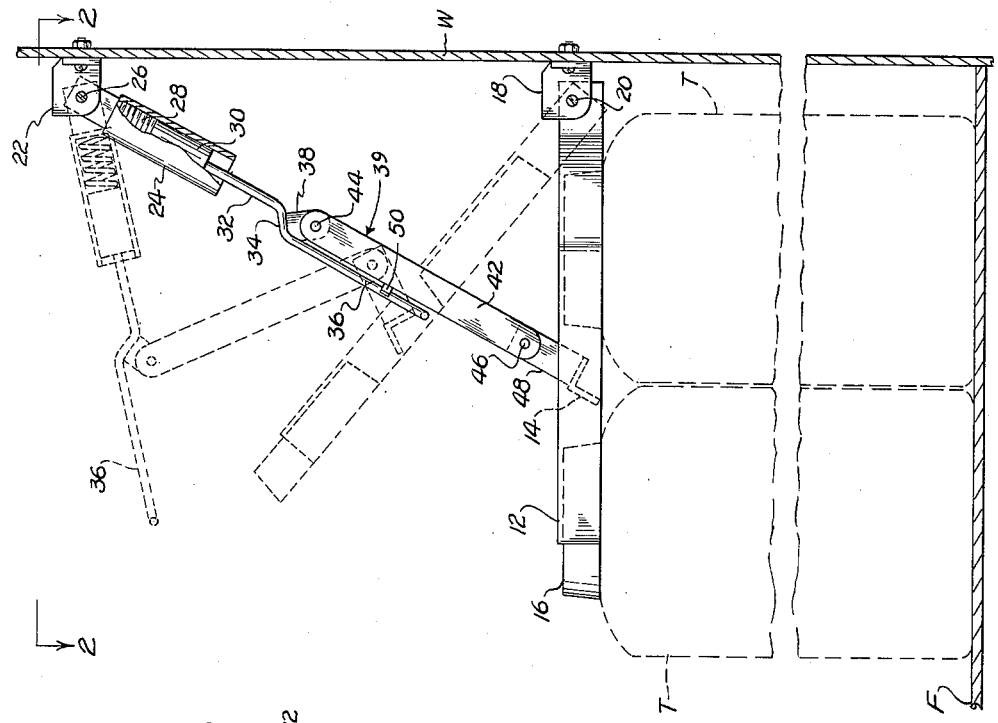

3,030,062
TANK HOLDER
Edmund M. Chevalier, Dutton, Mont.
Filed Jan. 30, 1961, Ser. No. 85,804
2 Claims. (Cl. 248—361)

This invention relates to a tank holder. In particular, the invention is directed to a device for holding down tanks being transported in a truck or the like.

The object of this invention is to produce a simple and effective device for holding tanks in place in a truck or other vehicle as they are being transported from one place to another.

In general, this and other objects are accomplished by using a pair of spaced arms hinged to a side wall of the truck and a holding plate which is adapted to press upon the top of a tank, such as a cylinder of liquid or gas. The pair of arms is actuated by two levers pivotally connected to each other and having their ends connected to the pair of arms and to the side wall of the vehicle, respectively. One of the levers is composed of a piston slidable in a cylinder against a compression spring. When the two levers are brought into alignment with each others, the piston presses against the spring of the cylinder and exerts a downward elastic pressure upon the pair of arms and onto the top of a tank. This compressive force is sufficient to keep the tanks from toppling over and from rattling as they are being carried by a vehicle.

The means by which the objects of the invention are obtained are described more fully with reference to the accompanying drawings, in which:

FIGURE 1 is a side elevational view of the hold-down device; and

FIGURE 2 is a plan view taken on the line 2—2 of FIGURE 1.

The vehicle has a floor F upon which rests one or more tanks T. Secured to the side wall W of the vehicle, which serves as a vertical frame, is a pair of spaced arms 10 and 12 separated by a crossbeam 14. Fastened between the arms are one or more downwardly directed cup-shaped plates 16 which are adapted to press downwardly on the top of a tank T, as shown in FIGURE 1. The pair of arms 10 and 12 is pivotally secured to the side wall W by means of brackets 18 and bolts 20. Above bracket 18 is another bracket 22 fastened to side wall W and to which a piston cylinder 24 is connected by bolt 26. A compression spring 28 is mounted in said cylinder which acts against piston 30 slidable in the cylinder. The piston rod 32 extends outwardly of the cylinder and is joined through an offset portion 34 to a manually actuatable handle 36. The cylinder 24, piston rod 32, and handle 36 constitute a first lever. A projection 38 welded to the offset portion 34 provides a means for pivotally joining a second lever 39 to the first lever and to the crossbeam 14. This second lever is composed of a pair of bars 40 and 42 joined at one end by bolt 44 to projection 38 and by bolt 46 to bracket 48 welded to crossbeam 14. Guide lugs 50 secured to bars 40 and 42, respectively, serve to keep handle 36 aligned with the second lever when the levers are in closed position.

In operation, the device is used to hold down a single tank or two or more tanks T, as shown in FIGURE 1. A line of tanks can be arranged along the side wall W and separate hold-down devices used for the individual tanks. When the device is opened by lifting the handle 36, as shown in dashed lines in FIGURE 1, the movement is such that piston 30 is drawn back in cylinder 24 and releases the pressure on spring 28. At the same time, the second lever pulls up the pair of hold-down arms and thus clears a space so that tanks can be either placed beneath or taken away from the hold-down position. The lever 36 is pulled downwardly, piston 30 compresses against spring 28; and in closed position, the first and second levers are aligned with one another so that the compression of spring 28 exerts a compressive force against crossbeam 14 and, in turn, through arms 10 and 12 and plate 16 upon the top of the tanks. This compressive force is sufficient to keep the tanks from toppling and from rattling as they are being transported in a vehicle. The device has the advantage of being of simple and easily actuatable construction for holding one or more tanks in a vehicle. A rack composed of these hold-down devices can serve for holding down a plurality of tanks arranged longitudinally along the side wall of a vehicle.

Having now described the means by which the objects of the invention are obtained, I claim:

1. A tank holder comprising a floor adapted to support a tank and a wall connected to said floor for forming a vertical frame, a pair of spaced arms pivotally secured to said wall and movable between a horizontal and an inclined position, a tank hold-down plate secured between said arms, a first lever pivotally secured to said wall above said spaced arms and including a cylinder, a piston movably mounted against a compression spring in said cylinder, and a manually actuatable handle, and a second lever pivotally joined to said first lever and to said pair of arms for forcing said pair of arms into horizontal tank holding position when said first lever is moved into alignment with said second lever.

2. A tank holder as in claim 1, further comprising a crossbeam connected between said pair of arms, and said second lever being pivotally connected to said crossbeam.

References Cited in the file of this patent
UNITED STATES PATENTS

| | | |
|---|---|---|
| 1,508,957 | Collins | Sept. 16, 1924 |
| 2,263,944 | Cline | Nov. 25, 1941 |
| 2,325,897 | Waltman | Aug. 3, 1943 |
| 2,837,217 | Norris | June 3, 1958 |